3,298,983
WATERPROOF, PLASTIC COMPOSITIONS OF MATTER RESISTANT TO ELECTROSTATIC CHARGE CONSISTING OF HOMO- AND COPOLYMERS OF VINYL CHLORIDE
Werner Wolff, Neuotting (Inn), Germany, assignor to Farbwerke Hoechst Aktiengesellschaft, vormals Meister Lucius & Bruning, Frankfurt am Main, Germany, a corporation of Germany
No Drawing. Filed May 22, 1964, Ser. No. 369,631
Claims priority, application Germany, May 22, 1963, F 39.810
6 Claims. (Cl. 260—23)

In the processing of polyvinyl chloride to obtain shaped articles, especially sheets, the electrostatic charge is very inconvenient in that the operator of the calander may get strong electric shocks. Moreover, the sheets obstinately stick to one another, they attract dust and on rolling them off they may be damaged by sparks.

The electrostatic charge can be overcome relatively easily by incorporating more or less water-soluble salts, particularly when these salts are slightly hygroscopic or are used in the presence of other hygroscopic substances. It is obvious that an electrostatic charge is avoided only as long as the plastic material does not come into contact with water for a prolonged period of time. Water dissolves the water-soluble salts, i.e., the substances conferring conductivity upon the plastic material.

It is an object of the present invention to provide components which are compatible with hard and soft polyvinyl chloride and copolymers essentially consisting of vinyl chloride, which are insoluble in water and are capable of conferring upon the polymers a conductivity for electricity. Moreover, the components to be used must be stable towards anti-ageing substances, light-protective agents or pigments simultaneously present in the plastic material, they shall have as little as possible a taste and odor, they shall be colorless and finally they must be harmless from a physiological point of view.

It has now been found that for the above purpose there can be used with special advantage the partial esters of polyhydric ether alcohols with aliphatic, hydroaromatic and aromatic acids.

The object of the present invention are plastic, waterproof compositions of matter consisting esstentially of homo- or copolymers of vinyl chloride which may contain the usual platicizers, stabilizers, lubricants, dyestuffs and pigments and which are rendered resistant to electrostatic charge by a content of 0.5 to 10, preferably 1 to 5% by weight, calculated on the composition of matter, of a partial ester of polyhydric ether alcohols, advantageously diglycerol or polyglycerol, with organic acids.

As ether alcohols there are preferably used the dehydration products diglycerol and polyglycerol obtained by dehydration of glyceral. The diglycerol may still contain, depending on the manufacturing conditions, certain amounts of unreacted glycerol and may contain small amounts of polyglycerol, whereas polyglycerol is a mixture essentially consisting of tri- and tetraglycerol.

Suitable acid esterification components are particularly the fatty acids obtained from natural fats and oils, for example coconut oil fatty acid, palm kernel oil fatty acid, stearic acid, oleic acid, and the like; moreover benzoic acid and hydrogenated benzoic acids, colophony and hydrophenanthrene carboxylic acid. The aforesaid acids can be reacted and worked up with the ether alcohols as such or preferably in admixture with one another.

The two components shall be esterified with one another in such a ratio that at least one hydroxyl group of the ether alcohol is not occupied and that at least one hydroxyl group is esterified. It is especially advantageous to esterify approximately one half of the hydroxyl groups present. In the case of diglycerol this means that two acid radicals are incorporated into the molecule.

The esterification can be carried out according to any process known for this reaction, for example by directly heating the components in the presence or absence of catalysts or by boiling in solvents the vapors of which form an azeotrope with the reaction water. According to their constitution the reaction products obtained are mixtures of various esterification stages containing certain amounts of unreacted ether alcohol in statistic distribution.

Besides the substances specified above there may be used the semi-esters of polyether alcohols of the type of low molecular weight polyglycols with the acids defined above.

The compositions of matter according to the invention may contain the additives generally used for vinyl chloride polymers, such as plasticizers, stabilizers, lubricants, dyestuffs, pigments and other fillers.

As plasticizers there can be used, for example, phthalic acid esters, such as dioctyl phthalate; suitable stabilizers are, for example, the commonly used cadmium compounds, such as cadmium stearate, while as lubricants calcium stearate or montan waxes may be added.

The above-defined compounds which render vinyl chloride polymers resistant to electrostatic charge are incorporated into the polymer in known manner by mixing on the roll, in a kneader or in an extruder. By the incorporation according to the invention of 0.5 to 10% of the specified compounds there can be rendered resistant to electrostatic charge hard polyvinyl chloride as well as polyvinyl chloride containing platicizer. Neither the transparency nor the appearance of the plastic masses are detrimentally affected by the incorporation of the specified compounds and the anti-static agents do not exude from the polymers at elevated temperatures. The anti-static effect can be measured in known manner by determination of the conductivity. In practice a simple test can be used in which a specimen of the plastic material which has been electrically charged by rubbing, for example a plate, is approached to tabac ash; in the case of a material rendered resistant to electrostatic charge the ash is not attracted.

The following example serves to illustrate the invention but it is not intended to limit it thereto, the percentages are by weight unless otherwise stated.

*Example*

70% of a vinyl chloride emulsion polymer were homogeneously mixed in a high-capacity kneader with 30% of dioctyl phthlate. Into the composition of matter there were then incorporated 5% of a polyglycerol monococonut oil fatty acid ester as anti-static agent 0.6% of calcium stearate as stabilizer and 2% of a montan wax as lubricant. After having been processed on the calander the sheets obtained remained free from electrostatic charge.

I claim:
1. A composition of matter resistant to electrostatic charge consisting essentially of:
   (1) a polymer selected from the group consisting of:
      (A) vinyl chloride homopolymers, and
      (B) copolymers of vinyl chloride and another vinyl monomer copolymerizable therewith; and
   (2) from 0.5 to 10% by weight of a partial ester derived from the reaction of
      (A) a polyol selected from the group consisting of diglycerol and polyglycerol, and
      (B) as a sole acid, a monocarboxylic organic acid, component (2) being the sole partial ester of a polyol present in the composition.
2. A composition of matter as claimed in claim 1 wherein the partial ester is present in 1 to 5% by weight.

3. A composition of matter as claimed in claim 1 wherein the monocarboxylic acid is selected from the group consisting of benzoic acid, a hydrogenated benzoic acid and a hydrophenanthrene carboxylic acid.

4. A composition of matter according to claim 1 wherein the composition of matter is a shaped article.

5. A composition of matter as claimed in claim 1 wherein the monocarboxylic acid is a fatty acid obtained from natural fats or oils.

6. A composition of matter as claimed in claim 5 wherein the monocarboxylic acid is selected from the group consisting of coconut oil fatty acid, palm kernel oil fatty acid, stearic acid and oleic acid.

References Cited by the Examiner

UNITED STATES PATENTS

| | | | |
|---|---|---|---|
| 1,860,098 | 5/1932 | Jaeger | 260—22 |
| 2,629,700 | 2/1953 | Caldwell | 260—23 |
| 2,664,410 | 12/1953 | Darby | 260—23 |
| 2,964,445 | 12/1960 | Daniel | 260—80.5 |
| 3,084,135 | 4/1963 | Scullin | 260—41 |

LEON J. BERCOVITZ, *Primary Examiner.*

DONALD E. CZAJA, *Examiner.*

F. McKELVEY, *Assistant Examiner.*